(12) United States Patent
Al Haddad et al.

(10) Patent No.: US 10,855,209 B2
(45) Date of Patent: Dec. 1, 2020

(54) ELECTRICAL POWER GENERATING CARPET

(71) Applicant: UNITED ARAB EMIRATES UNIVERSITY, Al Ain (AE)

(72) Inventors: Zinab Ahmed Al Haddad, Al Ain (AE); Maitha Al Kaabi, Al Ain (AE); Razan Youssef Kharouf, Al Ain (AE); Hamda Al Derei, Al Ain (AE); Walid Shakhatreh, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 553 days.

(21) Appl. No.: 15/727,060

(22) Filed: Oct. 6, 2017

(65) Prior Publication Data
US 2019/0109547 A1    Apr. 11, 2019

(51) Int. Cl.
*H01L 41/113* (2006.01)
*H02N 2/18* (2006.01)
*A47G 27/02* (2006.01)
*E04F 15/10* (2006.01)

(52) U.S. Cl.
CPC .............. *H02N 2/181* (2013.01); *A47G 27/02* (2013.01); *E04F 15/107* (2013.01); *H02N 2/18* (2013.01)

(58) Field of Classification Search
CPC .......... H02N 2/181; H02N 2/18; A47G 27/02; E04F 15/107
USPC ........................................................ 310/339
See application file for complete search history.

(56) References Cited

U.S. PATENT DOCUMENTS

| 5,004,059 A | 4/1991 | Webster | |
| 8,072,122 B2 * | 12/2011 | Gao | H02N 2/183 |
| | | | 310/330 |
| 2013/0069488 A1 * | 3/2013 | Goodemote | H01L 41/1132 |
| | | | 310/348 |
| 2013/0257156 A1 * | 10/2013 | Hadimani | H01L 27/301 |
| | | | 307/48 |

(Continued)

FOREIGN PATENT DOCUMENTS

| CN | 201590775 U | 9/2010 |
| CN | 102409833 A | 4/2012 |
| CN | 202207060 U | 5/2012 |

(Continued)

*Primary Examiner* — Thomas M Dougherty
(74) *Attorney, Agent, or Firm* — Nath, Goldberg & Meyer; Richard C. Litman

(57) ABSTRACT

The electrical power generating carpet is a carpet having piezoelectric-based electrical power generating tiles embedded therein. Each energy generating tile includes upper and lower plates, each having opposed top and bottom surfaces, at least one piezoelectric strip mounted on the top surface of the lower plate, and an engaging member attached to the bottom surface of the upper plate. The upper and lower plates are stacked such that the engaging member contacts the at least one piezoelectric strip. In use, when a person steps on the carpet, the upper plate of the at least one energy generating tile flexes, causing the engaging member thereof to apply pressure to the at least one piezoelectric strip to generate electrical voltage. When the person steps off the tile, the pressure is relieved, generating a current. An energy harvesting circuit including a rectifier and a buck converter are connected to the piezoelectric strips.

9 Claims, 4 Drawing Sheets

(56) References Cited

U.S. PATENT DOCUMENTS

2016/0027995 A1* 1/2016 Wagner ................... H01L 41/27
                                                        310/300
2017/0092251 A1* 3/2017 Mizrahi ................. G10H 1/348

FOREIGN PATENT DOCUMENTS

| CN | 104022556 A |   | 9/2014 |          |
|----|-------------|---|--------|----------|
| CN | 204071608 U | * | 1/2015 | ............ A47G 27/02 |
| CN | 204071608 U |   | 1/2015 |          |
| CN | 204517701 U |   | 7/2015 |          |
| DE | 102009022717 A1 | | 12/2010 |        |
| EP | 3121950 A1  |   | 1/2017 |          |
| ES | 1091315 U   |   | 10/2013 |         |
| JP | 2011153469 A |  | 8/2011 |          |
| JP | 2011233851 A |  | 11/2011 |         |
| JP | 2015021240 A | * | 7/2013 | ............ E04F 15/02 |
| JP | 2015021240 A |  | 2/2015 |          |
| KR | 101276284 B1 |  | 6/2013 |          |
| WO | WO 2009/109173 A1 | | 9/2009 |     |
| WO | 2013132441 A2 | | 9/2013 |         |

* cited by examiner

ELECTRICAL POWER GENERATING CARPET

BACKGROUND

1. Field

The disclosure of the present patent application relates to alternative energy sources, and particularly to an electrical power generating carpet that generates electricity when the carpet is walked upon.

2. Description of the Related Art

Global energy consumption is increasing at an exponential rate due to an ever-increasing human population, coupled with both basic human needs and a continually increasing reliance on electricity and machinery. Energy production from traditional resources (e.g., coal, water, wind, etc.) and newer renewable resources (e.g., solar, geothermal, etc.) is not sufficient to meet global energy demands. In addition, electrical energy produced from fossil-fuel or nuclear power sources present environmental hazards from greenhouse emissions and the disposal of hazardous waste. Although numerous attempts have been made to recover energy from human action itself, from bicycle-powered generators to shoes and clothing with embedded generators, none of these attempts have been entirely successful.

Thus, an electrical power generating carpet solving the aforementioned problems is desired.

SUMMARY

The electrical power generating carpet is a carpet having piezoelectric-based electrical power generating tiles embedded therein. At least one of the energy generating tiles is embedded or otherwise integrated in the carpet, which may be any suitable type of flexible carpet or floor covering, such as moquette carpeting or the like. Preferably, a plurality of the electrical power generating tiles are embedded in the carpet. Each energy generating tile includes upper and lower plates having opposed top and bottom surfaces, at least one piezoelectric strip mounted on the top surface of the lower plate, and an engaging member attached to the bottom surface of the upper plate. The upper and lower plates are stacked such that the engaging member contacts the at least one piezoelectric strip.

The upper plate is preferably formed from a flexible material, such as flexible plastic, and the lower plate is preferably formed from a rigid material, such as a rigid plastic. In use, when a user steps on the carpet tile, the upper plate of the tile flexes, causing the engaging member thereof to apply mechanical stress to the piezoelectric strip, thereby generating electrical voltage in the piezoelectric material. When the user steps off the carpet tile, the mechanical stress is relieved, generating an electric current through the piezoelectric material. Preferably, each tile includes a plurality of piezoelectric strips electrically connected to one another in parallel. The plurality of piezoelectric strips are each oriented substantially parallel with respect to one another and the engaging member is oriented substantially orthogonal with respect to the plurality of piezoelectric strips, such that when the user steps on the carpet, the engaging member causes the stress to be evenly distributed across the plurality of piezoelectric strips. Preferably, a full-wave bridge rectifier is provided for each tile. The rectifiers produce a direct current output.

These and other features of the electrical power generating carpet will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
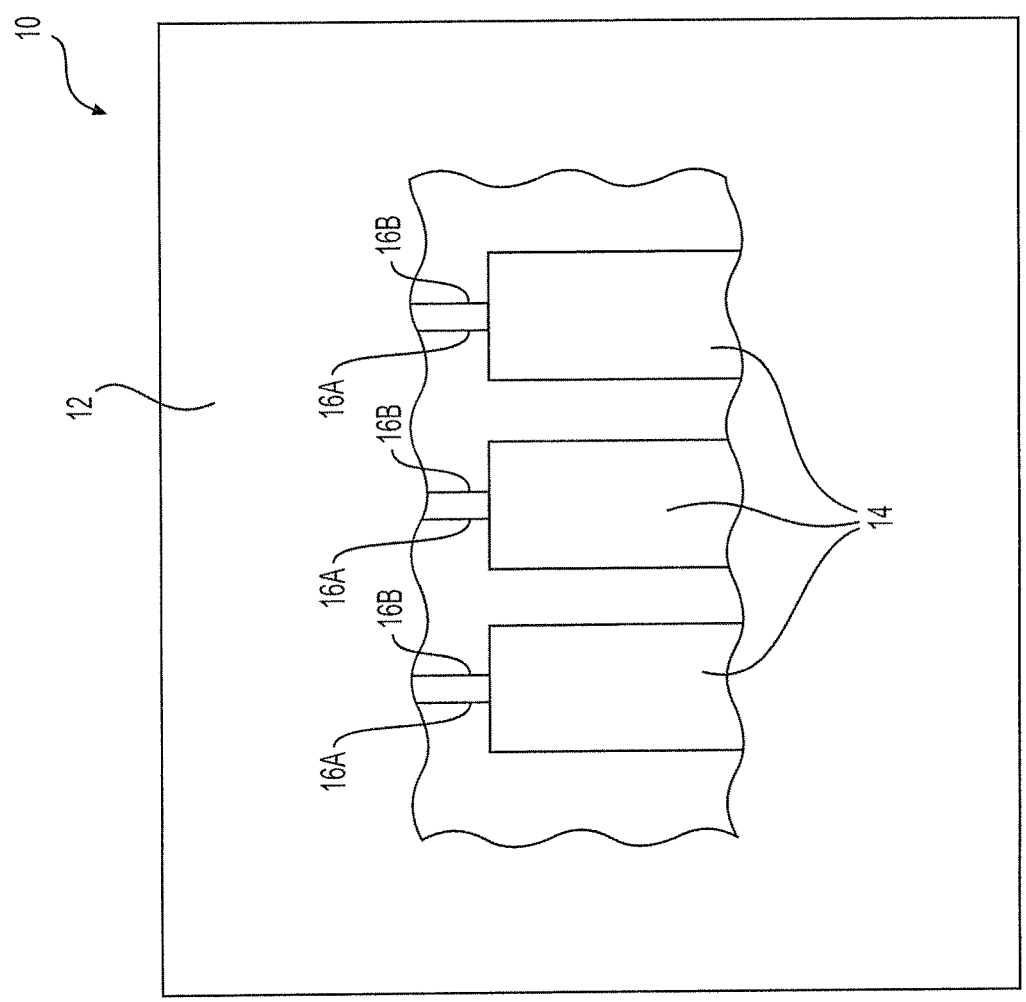
FIG. 1 is a top view of an electrical power generating carpet, partially broken away to show tiles embedded therein.
Figure 2:
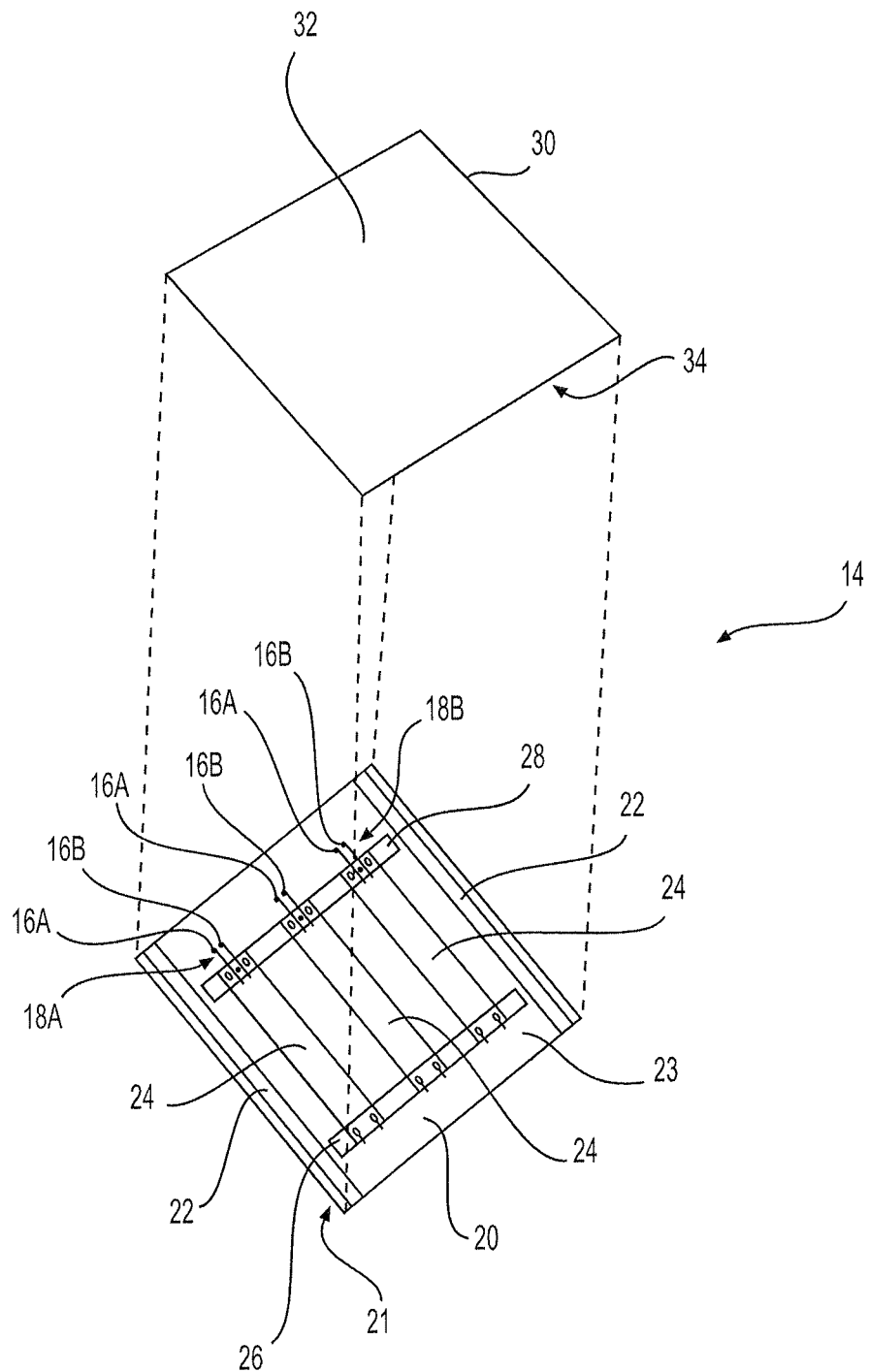
FIG. 2 is a perspective view of one of the tiles embedded in the electrical power generating carpet of FIG. 1, shown with the upper plate exploded from the lower plate.

The electrical power generating carpet, referred to generally in the drawings as 10, is a carpet having piezoelectric-based electrical power generating tiles 14 embedded therein. As shown in FIG. 1, at least one of the energy generating tiles 14 is embedded or otherwise integrated in the external carpet material 12, which may be any suitable type of flexible carpet or floor covering, such as moquette carpeting or the like. Preferably, a plurality of tiles 14 are embedded in the carpet 12. As best seen in FIG. 2, each tile 14 includes a lower plate 20 having a bottom surface 21 and a top surface 23, and an upper plate 30 having a top surface 32 and a bottom surface 34. The upper plate 30 is preferably formed from a flexible material, such as flexible plastic, and the lower plate 20 is preferably formed from a rigid material, such as a rigid plastic.

It should be understood that the overall dimensions and configuration of the tile 14 shown in FIG. 2 are provided for exemplary purposes only. The overall number and size of tiles 14 will ultimately depend upon the particular flooring application and design of the overall carpet 10. A typical exemplary configuration for the lower plate 20 and the upper plate 30 is a square configuration with each side having a length of approximately twenty centimeters. For such exemplary dimensions, upper plate 30 would typically have a thickness of approximately two millimeters, and the lower plate 20 would typically have a thickness of approximately six millimeters. As noted above, the upper plate 30 is preferably flexible, and it should be understood that any suitable type of flexible and resilient material may be used. As an example, upper plate 30 may be formed from flexible plastic. An additional thin layer of aluminum may be adhered to the top surface 32 of upper plate 30 to provide additional protection for the upper plate 30 as users walk on the carpet 10.

Figure 4:
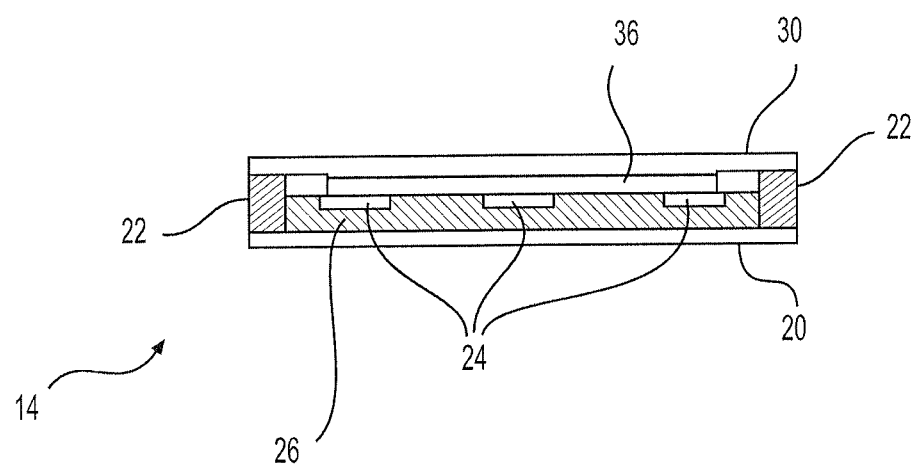
FIG. 4 is a side view in section of the tile of FIG. 2.

As shown, at least one piezoelectric strip 24 is mounted on the top surface 23 of the lower plate 20. Preferably, as shown, a plurality of piezoelectric strips 24 are mounted on the top surface 23, although it should be understood that the three piezoelectric strips 24 are shown for exemplary purposes only, and that any suitable number of piezoelectric strips 24 may be used in each tile 14. As shown in FIGS. 2 and 4, the piezoelectric strips 24 are not mounted directly on the top surface 23 of the lower plate 20, but are mounted on and extend across parallel spacers 26, 28 so that when a person steps on the tile 14, the piezoelectric strips 24 may bend slightly in the middle portion of the strips 24 between the two spacers 26, 28. The spacers 26, 28 may be formed from any suitable type of electrically nonconductive material, such as plastic or the like. Using the exemplary dimensions given above, the spacers 26, 28 may be rectangular and have a length of approximately fourteen centimeters, a width of approximately two centimeters, and a thickness of approximately two millimeters.

Figure 3:
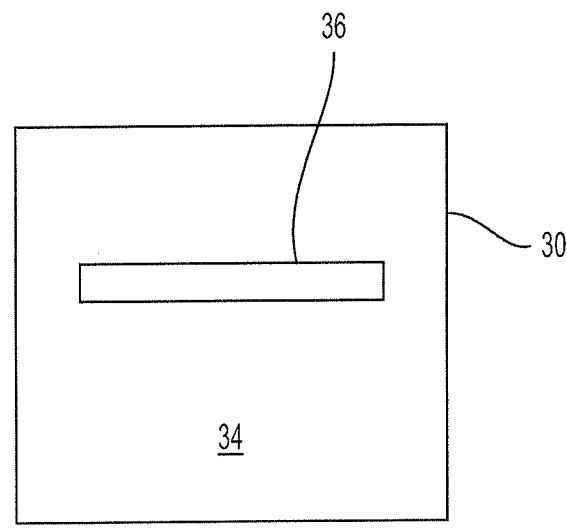
FIG. 3 is a bottom view of the upper plate of a tile of the electrical power generating carpet of FIG. 1.
Figure 5:
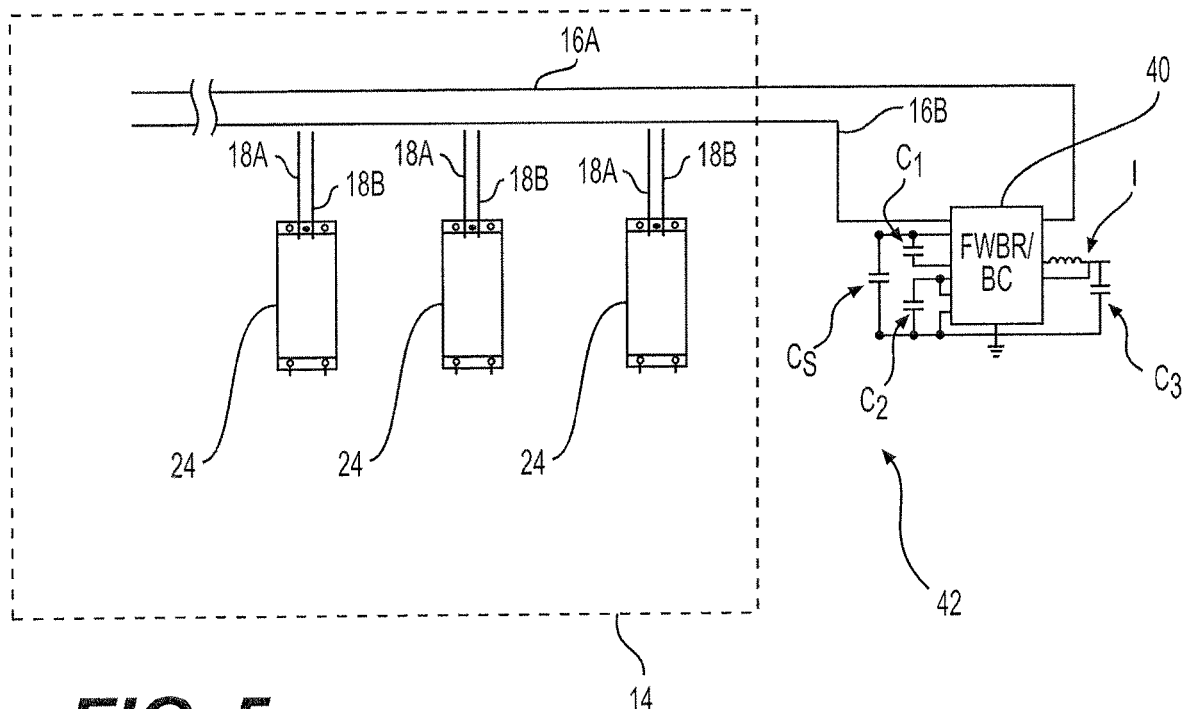
FIG. 5 is a schematic diagram of a tile of FIG. 2 connected to a rectifier.

As best shown in FIGS. 3 and 4, an engaging member 36 is attached to the bottom surface 34 of the upper plate 30. In each tile 14, the lower and upper plates 20, 30 are stacked on top of each other such that the engaging member 36 contacts the at least one piezoelectric strip 24, and when a person steps on the upper plate 30, the engaging member 36 bears against the middle portion of each piezoelectric strip 24, bending the strip 24 and inducing a voltage therein. When the person steps off the tile 14, the upper plate 30 resiliently returns to its neutral position, lifting the engaging member 36 with it to relieve the bending stress on the piezoelectric strip 24, inducing a current in the strip 24. Thus, the upper plate 30 acts as a pressure plate to apply pressure to the piezoelectric strips 24. Each piezoelectric strip 24 has a pair of leads 18A, 18B, and as noted above, each tile 14 preferably includes a plurality of piezoelectric strips 24. As shown in FIGS. 2 and 5, piezoelectric strips 24 are preferably connected to one another in parallel (via their respective pairs of leads 18A, 18B), such that each tile 14 has a single pair of leads 16A, 16B. It should be understood that any suitable type of piezoelectric strips may be used. For example, piezoelectric strips may be D220-A4-503YB piezoelectric sensors or transducers manufactured by Piezo Systems, Inc. of Woburn, Mass.

In use, when a user steps on the carpet 10, the upper plate 30 of one or more tiles 14 flexes, causing the engaging member 36 thereof to apply a bending force to the piezoelectric strip(s) that it bears against 24 to generate an electrical potential across leads 16A, 16B. In the preferred embodiment of FIGS. 2-4, in which a plurality of piezoelectric strips 24 are provided, the plurality of piezoelectric strips 24 are each oriented substantially parallel with respect to one another and the engaging member 36 is oriented substantially orthogonal with respect to the plurality of piezoelectric strips 24. Thus, when the user steps on the carpet 10, the engaging member 36 causes the bending stress to be evenly distributed across the plurality of piezoelectric strips 24. Using the exemplary configuration described above, the engaging member 36 may be substantially rectangular, having a length of approximately twelve centimeters, a width of approximately one centimeter, and a thickness of approximately two millimeters. The engaging member 36 may be formed from any suitable type of electrically nonconductive material, such as flexible plastic or the like. As shown in FIGS. 2 and 4, a pair of laterally disposed spacers 22 may also be attached to the top surface 23 of the lower plate 20. The side spacers 22 support the upper plate 30 with sufficient thickness to compensate for the engaging member 36, piezoelectric strips 24 and spacers 26, 28 sandwiched between the upper plate 30 and the lower plate 20. Using the exemplary dimensions given above, the spacers 22 may be substantially rectangular, having a length of approximately twenty centimeters, a width of approximately two centimeters, and a thickness of approximately two millimeters.

Figure 6:
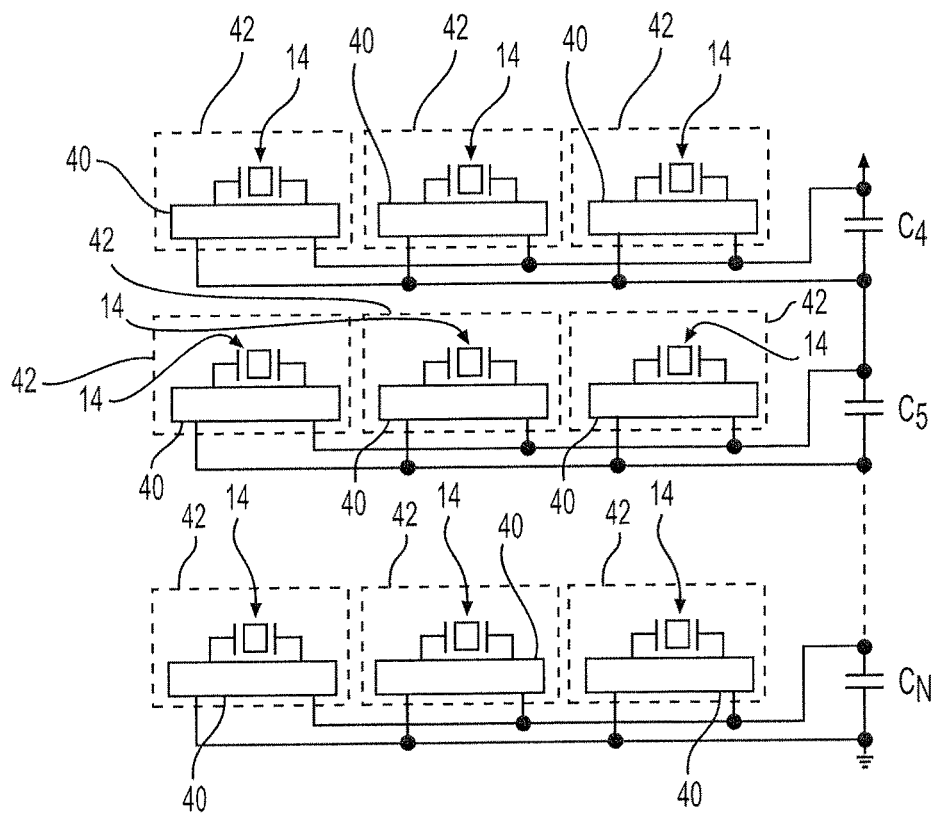
FIG. 6 is a schematic diagram showing electrical connection of the tiles in the electrical power generating carpet of FIG. 1.

With regard to power generation, as shown in FIG. 5, a full-wave bridge rectifier is preferably provided for each tile 14. Each full-wave bridge rectifier is in electrical communication with the corresponding tile 14 for producing a direct current (DC) output. In FIG. 5, a conventional full-wave bridge rectifier (FWBR) circuit (optionally combined with a buck converter (BC) and its associated circuitry), identified generally as 40 in the drawings, is connected to the tile 14 to form a piezoelectric power generating unit 42, which outputs a DC current. As shown in FIG. 6, sub-groupings of multiple such power generating units 42 may be interconnected across corresponding capacitors $C_4, C_5, \ldots C_N$ (for N−3 such sub-groupings). Here, the first sub-grouping (connected across capacitor C4) produces the first potential $V_{01+}$, and all N−3 sub-groupings contribute to the overall output voltage $V_{OUT+}$ for the electrical power generating carpet 10.

Returning to FIG. 5, it should be understood that any suitable type of full-wave bridge rectifier (and associated circuitry) may be used. As an example, FWBR/BC 40 may be a LTC3588-1 nanopower energy harvesting power supply chip, manufactured by Linear Technology of Milpitas, Calif. The LTC3588-1 chip has an energy harvesting circuit that integrates a full-wave bridge rectifier circuit with a high-efficiency buck converter circuit that regulates output of the rectifier circuit. Four output voltages (1.8 V, 2.5 V, 3.3 V and 3.6 V) are pin selectable with up to 100 mA of continuous output current. In the exemplary driver circuit of FIG. 5 associated with FWBR/BC 40, the storage capacitor $C_S$ may have a capacitance of 100 μF (rated at 16 V maximum), capacitor $C_1$ may have a capacitance of 1 μF (rated at 6 V maximum), capacitor $C_2$ may have a capacitance of 4.7 μF (rated at 6 V maximum), capacitor $C_3$ may have a capacitance of 47 μF (rated at 6 V maximum), and inductor I may have an inductance of 10 μH. The electrical power generated by the carpet may be used to power a load or used to recharge a battery or other electrical energy storage device.

It is to be understood that the electrical power generating carpet is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An electrical power generating carpet, comprising a carpet having at least one tile embedded therein, the at least one tile including:
   upper and lower plates, each of the plates having opposing top and bottom surfaces the upper plate being flexible and resilient, the upper plate being disposed on top of the lower plate;
   at least one elongated piezoelectric strip mounted on the top surface of the lower plate; and
   an engaging member attached to the bottom surface of the upper plate and bearing across the at least one piezoelectric strip between the opposing ends of the strip so that when a person steps on the at least one tile, the upper plate flexes and the engaging member exerts a bending stress on the at least one piezoelectric strip, inducing a voltage therein, and when the person steps off the at least one tile, the bending stress is removed, thereby generating a current in the at least one piezoelectric strip.

2. The electrical power generating carpet as recited in claim 1, wherein the lower plate of said at least one tile is rigid.

3. The electrical power generating carpet as recited in claim 1, wherein the at least one piezoelectric strip comprises a plurality of piezoelectric strips electrically connected to one another in parallel.

4. The electrical power generating carpet as recited in claim 3, wherein the plurality of piezoelectric strips are mounted on the top surface of said lower plate substantially parallel to one another.

5. The electrical power generating carpet as recited in claim 1, wherein the engaging member is oriented substantially orthogonal to the at least one piezoelectric strip.

6. The electrical power generating carpet as recited in claim 1, further comprising at least one full-wave rectifier electrically connected to the at least one piezoelectric strip for converting the induced current into direct current.

7. An electrical power generating carpet, comprising:
- a carpet;
- a plurality of tiles embedded in the carpet, each of the tiles having a pressure plate, wherein each of the tiles comprises a flexible, resilient upper plate and a rigid lower plate, the upper plate being attached to the lower plate;
- a piezoelectric assembly disposed in each of the tiles beneath the pressure plate, the piezoelectric assembly being configured for generating voltage and current in response to changes in pressure applied to the pressure plate, wherein the piezoelectric assembly comprises a plurality of piezoelectric sensor strips disposed parallel to each other and electrically connected in parallel, further wherein the piezoelectric assembly is disposed between the upper plate and the lower plate, the upper plate being the pressure plate;
- an energy harvesting circuit electrically connected to each of the piezoelectric members, the energy harvesting circuit including a full wave rectifier circuit and a buck converter circuit for regulating output of the full wave rectifier circuit; and
- an elongated engaging strip attached to the upper plate and oriented orthogonal to the piezoelectric sensor strips, the engaging strip bearing against the piezoelectric sensor strips so that wen pressure is exerted against the upper plate, the engaging strip distributes the pressure across all of the piezoelectric sensor strips in the tile.

8. The electrical power generating carpet according to claim 7, wherein said upper plate and said lower plate are each made from plastic.

9. The electrical power generating carpet according to claim 7, wherein said carpet comprises a moquette cover.

* * * * *